US012620606B2

(12) United States Patent
Okubo et al.

(10) Patent No.: US 12,620,606 B2
(45) Date of Patent: May 5, 2026

(54) POWER GENERATION CELL

(71) Applicant: HONDA MOTOR CO., LTD., Tokyo (JP)

(72) Inventors: Takuro Okubo, Wako (JP); Yoshihito Kimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 579 days.

(21) Appl. No.: 18/094,059

(22) Filed: Jan. 6, 2023

(65) Prior Publication Data

US 2023/0223563 A1 Jul. 13, 2023

(30) Foreign Application Priority Data

Jan. 12, 2022 (JP) ................................. 2022-003183

(51) Int. Cl.
*H01M 8/026* (2016.01)
*H01M 8/1004* (2016.01)

(52) U.S. Cl.
CPC ......... *H01M 8/026* (2013.01); *H01M 8/1004* (2013.01)

(58) Field of Classification Search
CPC .. H01M 8/026; H01M 8/1004; H01M 8/0263; H01M 8/0265; H01M 2008/1095; H01M 8/0258; H01M 8/2483; H01M 8/0202; H01M 8/0247; H01M 8/04291; Y02E 60/50
See application file for complete search history.

(56) References Cited

U.S. PATENT DOCUMENTS

2019/0198889 A1 6/2019 Nishida
2020/0028188 A1 1/2020 Sasaki et al.

FOREIGN PATENT DOCUMENTS

| CN | 110739474 A | 1/2020 |
| JP | 2008-171608 A | 7/2008 |
| JP | 2010-073565 A | 4/2010 |
| JP | 2011-171028 A | 9/2011 |
| JP | 2018-055790 A | 4/2018 |
| JP | 2019-117721 A | 7/2019 |
| JP | 2020-013742 A | 1/2020 |
| WO | 2020/056580 A1 | 3/2020 |

OTHER PUBLICATIONS

Office Action dated Nov. 7, 2023 issued in the corresponding Japanese Patent Application No. 2022-003183 with the English machine translation thereof.
Office Action and Search Report dated May 13, 2025 issued in the corresponding Chinese Patent Application No. 202310041056.0 with the English machine translation thereof.
Office Action dated Feb. 27, 2024 issued in the corresponding Japanese Patent Application No. 2022-003183 with the English machine translation thereof.

*Primary Examiner* — Helen Oi K Conley
(74) *Attorney, Agent, or Firm* — Carrier, Shende & Associates P.C.; Joseph P. Carrier; Jeffrey T. Gedeon

(57) ABSTRACT

In a power generation cell, cathode flow field grooves forming a gas flow field of a cathode separator arranged to face an MEA are formed of first cathode flow field grooves blocked on an outlet side and second cathode flow field grooves blocked on an inlet side. The first cathode flow field grooves and the second cathode flow field grooves are arranged adjacent to each other in the flow field width direction.

8 Claims, 9 Drawing Sheets

FIG. 8A
42a          42          44          36          42b
44b                                              44a
46A                                              46B
B1 ← B → B2
FIG. 8B
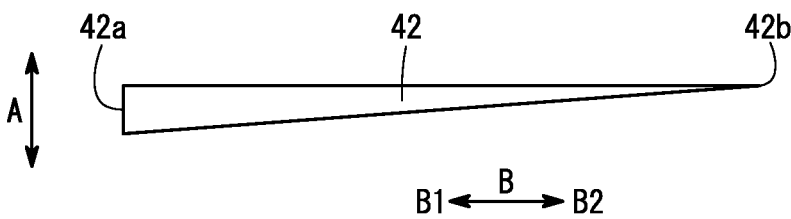
42a          42          42b
A
B1 ← B → B2
FIG. 8C
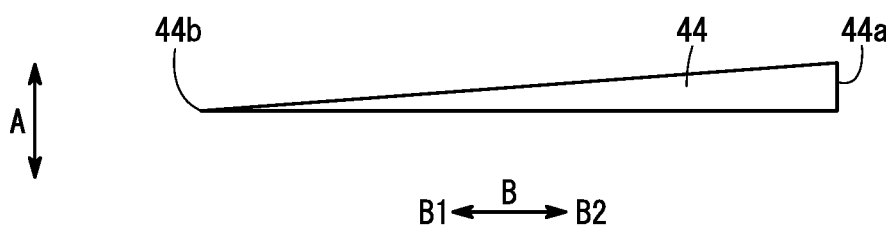
44b          44          44a
A
B1 ← B → B2

FIRST CATHODE FLOW FIELD GROOVE

FLOW FIELD
CROSS-SECTIONAL
AREA

POSITION IN B DIRECTION

CATHODE INFLOW
OPEN END

CATHODE OUTFLOW
BLOCKED END

SECOND CATHODE FLOW FIELD GROOVE

FLOW FIELD
CROSS-SECTIONAL
AREA

POSITION IN B DIRECTION

CATHODE INFLOW
BLOCKED END

CATHODE OUTFLOW
OPEN END

POWER GENERATION CELL

CROSS-REFERENCE TO RELATED APPLICATIONS

This application is based upon and claims the benefit of priority from Japanese Patent Application No. 2022-003183 filed on Jan. 12, 2022, the contents of which are incorporated herein by reference.

BACKGROUND OF THE INVENTION

Field of the Invention

The present invention relates to a power generation cell of a fuel cell system.

Description of the Related Art

A fuel cell system is a power generation system that generates power by electrochemical reactions between a fuel gas such as hydrogen and an oxygen-containing gas such as air and does not discharge $CO_2$. The fuel cell system may be mounted on a fuel cell vehicle or the like excellent in environmental performance. In addition, a regenerative fuel cell system using hydrogen and oxygen generated through energy storage by electrolysis of water can be used for output leveling of a solar power generation system or a wind power generation system having great fluctuations in output, and also contributes to expansion of use of sustainable renewable energy.

For example, JP 2019-117721 A discloses a structure of a power generation cell of a fuel cell system.

SUMMARY OF THE INVENTION

A conventional power generation cell has a problem in that water generated by electrochemical reactions is likely to be retained inside a membrane electrode assembly (MEA). Therefore, a power generation cell having excellent drainage performance is desired.

An object of the present invention is to solve the aforementioned problem.

An aspect of the disclosure is a power generation cell comprising a membrane electrode assembly, a cathode separator and an anode separator, the membrane electrode assembly including a electrolyte membrane and electrodes arranged on both sides of the electrolyte membrane, the membrane electrode assembly being sandwiched by the cathode separator and the anode separator, wherein the cathode separator comprises cathode line ridges that protrude from the cathode separator, contact the membrane electrode assembly and extend in a flow direction of the oxygen-containing gas, and a plurality of cathode flow field grooves that are formed between the cathode line ridges and form an oxygen-containing gas flow field, the plurality of cathode flow field grooves comprise a first cathode flow field groove that is blocked on a downstream side in the flow direction of the oxygen-containing gas, and a second cathode flow field groove that is blocked on an upstream side in the flow direction of the oxygen-containing gas, and the second flow field groove is arranged adjacent to the first flow field groove in the flow field width direction.

In the power generation cell of the above aspect, the first cathode flow field groove blocked on the downstream side in the flow direction of the oxygen-containing gas and the second cathode flow field groove blocked on the upstream side in the flow direction of the oxygen-containing gas are adjacent to each other in the flow field width direction. Thus, the oxygen-containing gas is caused to flow from the first cathode flow field groove toward the second cathode flow field groove in the membrane electrode assembly. The water generated in the membrane electrode assembly is efficiently removed not only by a passive process based on a water vapor diffusion process but also by an active process using a water transport phenomenon based on active fluid movement caused by the flow of the oxygen-containing gas. Therefore, the power generation cell is excellent in drainage performance, can prevent reaction inhibition due to flooding, and improves power generation efficiency.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a cross-sectional view illustrating the function of the cathode separator shown in FIG. 2;

FIG. 8A is a schematic diagram illustrating an arrangement of oxygen-containing gas flow field of a cathode separator according to a fourth embodiment;

FIG. 8B is a view illustrating a distribution along the center line of the first cathode flow field groove, regarding depth of the first cathode flow field groove in the arrow A direction;

FIG. 8C is a view illustrating a distribution along the center line of the second cathode flow field groove, regarding depth of the second cathode flow field groove in the arrow A direction;

DETAILED DESCRIPTION OF THE INVENTION

First Embodiment

Figure 1:
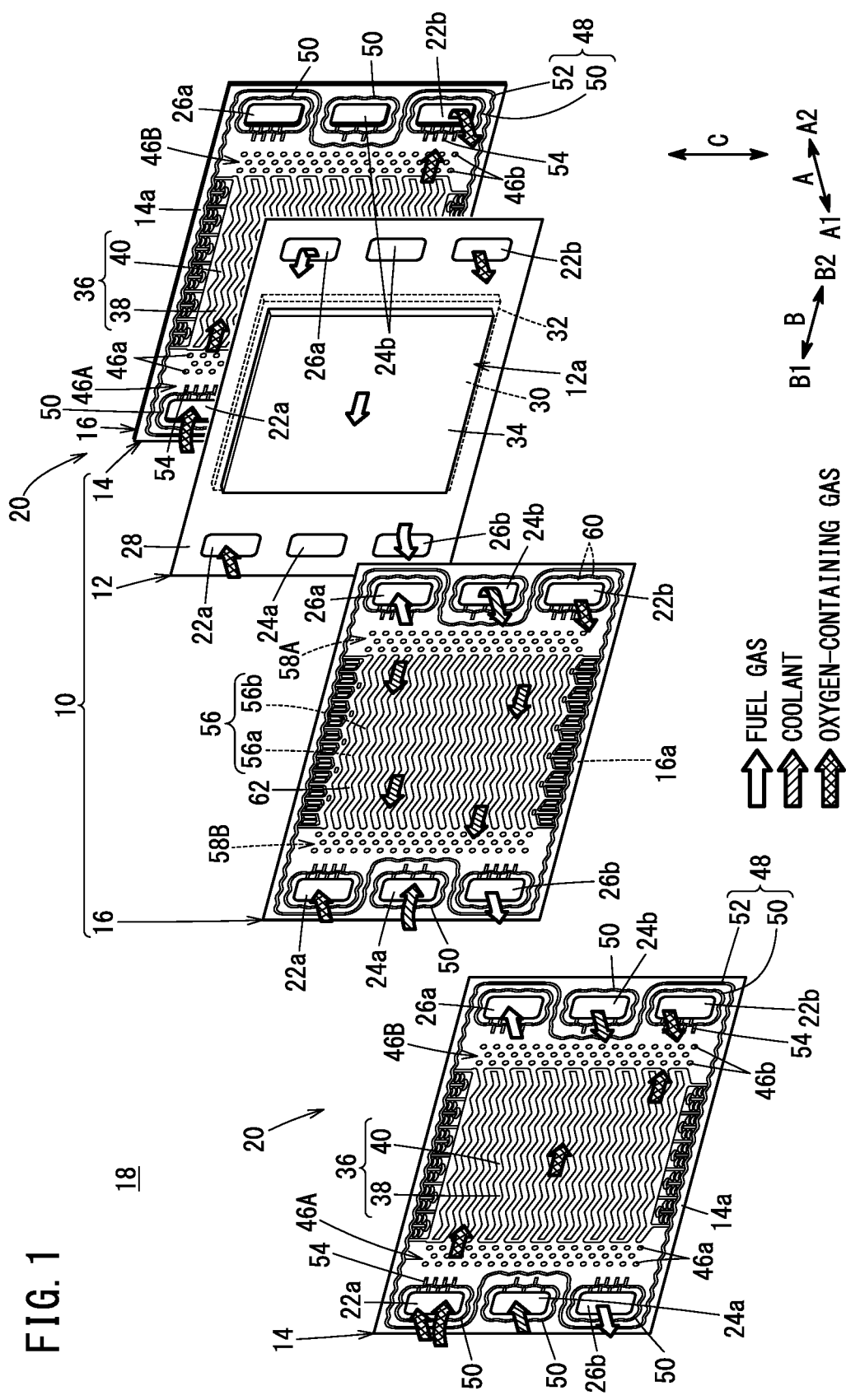
FIG. 1 is an exploded perspective view of a power generation cell according to a first embodiment.

A power generation cell 10 shown in FIG. 1 forms a unit fuel cell and includes a MEA 12, a cathode separator 14, and an anode separator 16. The cathode separator 14 is a metallic or carbon separator disposed on the cathode side (the side in the arrow A2 direction) of the MEA 12. The anode separator 16 is a metallic or carbon separator disposed on the anode side (the side in the arrow A1 direction) of the MEA 12. Usually, a fuel cell system 18 includes a plurality of power generation cells 10. The plurality of power generation cells 10 are stacked in the thickness direction in the fuel cell system 18. The fuel cell system 18 may be mounted on a fuel cell vehicle. The fuel cell system 18 may alternatively be mounted as a regenerative fuel cell system in, for example, space equipment, underwater equipment, an output leveling device of a renewable power generation system, or the like.

The cathode separator 14 and the anode separator 16, for example, are made of thin metal plates such as steel plates, stainless steel plates, aluminum plates, plated steel sheets, or metal plates having anti-corrosive surfaces produced by performing a surface treatment. The cathode separator 14 and the anode separator 16 are formed in wavy shapes by press molding. The cathode separator 14 and the anode separator 16 used in the fuel cell system 18 are integrally joined to form a joint separator 20. The cathode separator 14 and the anode separator 16 forming the joint separator 20 belong to different power generation cells 10 adjacent to each other.

The power generation cell 10 has a rectangular planar shape. The power generation cell 10 has an oxygen-containing gas supply passage 22a, a coolant supply passage 24a, and a fuel gas discharge passage 26b at one end of a long side (the end in the arrow B1 direction). These passages pass through the cathode separator 14 and the anode separator 16 in the thickness direction. These passages communicate with the passages of other joint separator 20 and a resin frame member 28 disposed in the stacking direction (the arrow A direction), respectively, and form flow paths in the stacking direction (the arrow A direction).

The oxygen-containing gas supply passage 22a, the coolant supply passage 24a, and the fuel gas discharge passage 26b are aligned along a short side (in the arrow C direction). An oxygen-containing gas is supplied through the oxygen-containing gas supply passage 22a. In this specification, the oxygen-containing gas is air or pure oxygen gas. The oxygen-containing gas may include water vapor supplied through a humidifier and water vapor generated by electrode reactions.

In a preferred embodiment, pure oxygen at a relatively low pressure (for example, 0.1 to 1 MPa) is supplied as the oxygen-containing gas. In the conventional high current density type fuel cell, the pressure loss of the gas flow field is increased to blow off the generated water and prevent the generated water from being retained inside, whereas in the case of the low pressure pure oxygen, the pressure of the supplied gas is low, so that the lowering of the power generation efficiency due to the high pressure loss is not likely to occur. Further, because there is no partial pressure of nitrogen in the oxygen-containing gas, it is possible to increase the partial pressure of water vapor in the oxygen-containing gas, thereby improving the properties for discharging the generated water. A coolant, for example, water, is supplied through the coolant supply passage 24a. A fuel gas is discharged through the fuel gas discharge passage 26b. The fuel gas is a gas containing hydrogen as a main component. In a preferred embodiment, pure hydrogen gas is supplied as the fuel gas. The fuel gas may include water vapor generated by electrode reactions or the humidifier.

The power generation cell 10 has a fuel gas supply passage 26a, a coolant discharge passage 24b, and an oxygen-containing gas discharge passage 22b at the other end of the long side (the end in the arrow B2 direction). These passages pass through the cathode separator 14 and the anode separator 16 in the thickness direction. These passages communicate with the passages of other joint separator 20 and the resin frame member 28 disposed in the stacking direction (the arrow A direction), respectively, and form flow paths in the stacking direction (the arrow A direction).

The fuel gas supply passage 26a, the coolant discharge passage 24b, and the oxygen-containing gas discharge passage 22b are aligned along the short side. The fuel gas is supplied through the fuel gas supply passage 26a. The coolant is discharged through the coolant discharge passage 24b. The oxygen-containing gas is discharged through the oxygen-containing gas discharge passage 22b. The flow direction of the fuel gas is opposite to the flow direction of the oxygen-containing gas. The arrangement of the oxygen-containing gas supply passage 22a and the oxygen-containing gas discharge passage 22b, as well as the fuel gas supply passage 26a and the fuel gas discharge passage 26b is not limited to that shown for the present embodiment, and may be set appropriately depending on required specifications.

The MEA 12 includes a membrane electrode assembly (hereinafter referred to as a "MEA 12a") and the resin frame member 28. The resin frame member 28 is a frame-shaped resin sheet joined to the outer peripheral portion of the MEA 12a.

Figure 4:
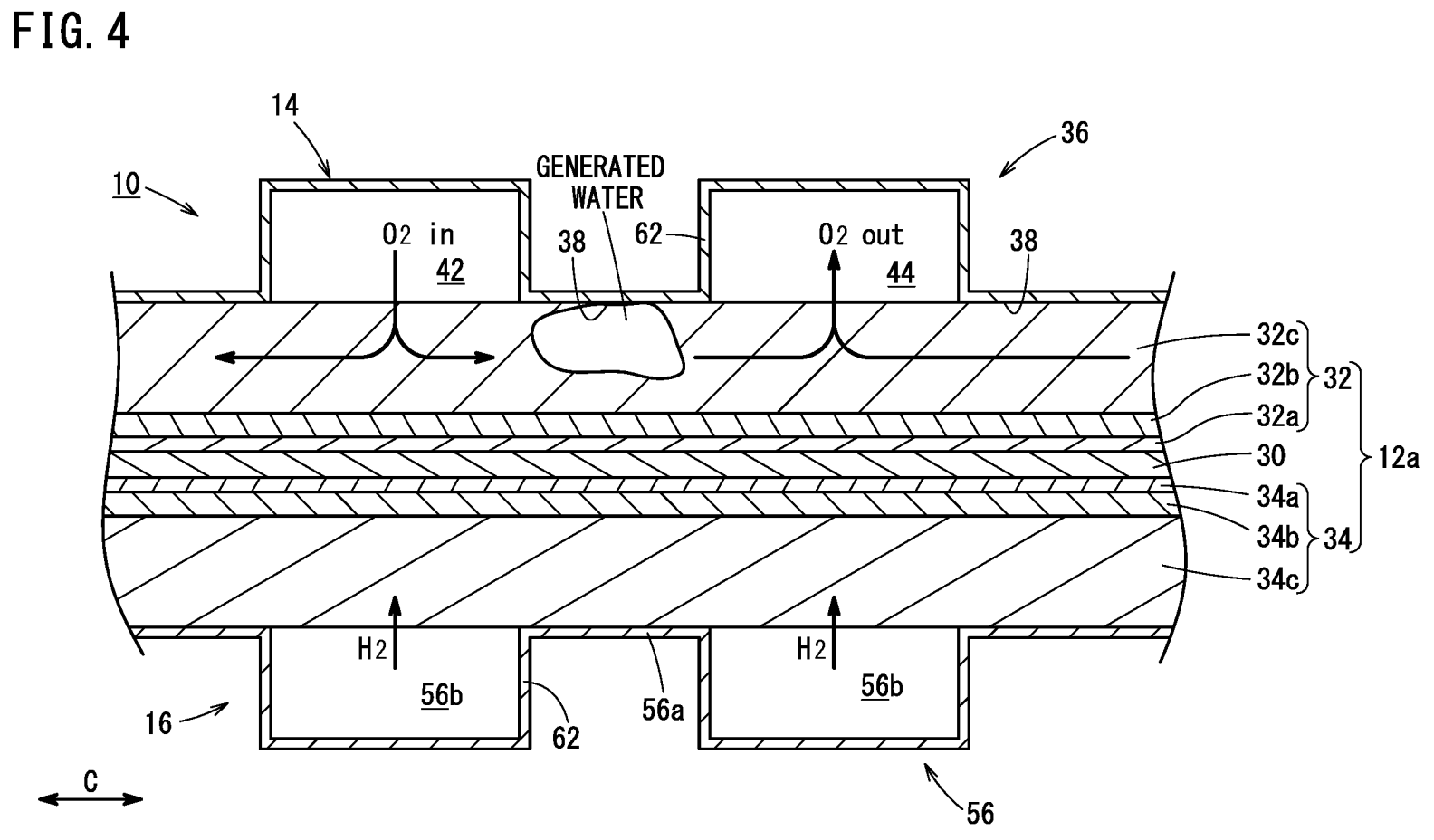

As shown in FIG. 4, the MEA 12a includes an electrolyte membrane 30, and a cathode 32 and an anode 34 sandwiching the electrolyte membrane 30. The electrolyte membrane 30, for example, is a solid polymer electrolyte membrane (cation exchange membrane). The solid polymer electrolyte membrane is formed by impregnating a thin membrane of perfluorosulfonic acid with water, for example. A fluorine based electrolyte may be used as the electrolyte membrane 30. Alternatively, an HC (hydrocarbon) based electrolyte may be used as the electrolyte membrane 30.

The cathode 32 includes a cathode catalyst layer 32a joined to one surface of the electrolyte membrane 30, a first microporous layer 32b stacked on the cathode catalyst layer 32a, and a cathode diffusion layer 32c stacked on the first microporous layer 32b. The anode 34 includes an anode catalyst layer 34a joined to the other surface of the electrolyte membrane 30, a second microporous layer 34b stacked on the anode catalyst layer 34a, and an anode diffusion layer 34c stacked on the second microporous layer 34b.

Each of the cathode catalyst layer 32a and the anode catalyst layer 34a is, for example, a layer mainly composed of porous carbon particles with platinum alloy supported on surfaces thereof. The first microporous layer 32b and the second microporous layer 34b are layers mainly composed of water-repellent resins such as PTFE and conductive materials such as carbon black. The first microporous layer 32b and the second microporous layer 34b may be omitted from the power generation cell 10. The cathode diffusion layer 32c and the anode diffusion layer 34c are formed of carbon paper, carbon cloth, or the like.

As shown in FIG. 1, at a marginal portion of the resin frame member 28 on the arrow B1 side, the oxygen-containing gas supply passage 22a, the coolant supply passage 24a, and the fuel gas discharge passage 26b are provided. At a marginal portion of the resin frame member 28 in the arrow B2 direction, the fuel gas supply passage 26a, the coolant discharge passage 24b, and the oxygen-containing gas discharge passage 22b are provided. The inner peripheral portion of the resin frame member 28 is joined to the outer peripheral portion of the MEA 12a with an adhesive. The resin frame member 28 is made of a resin material having electrical insulation properties.

Figure 2:
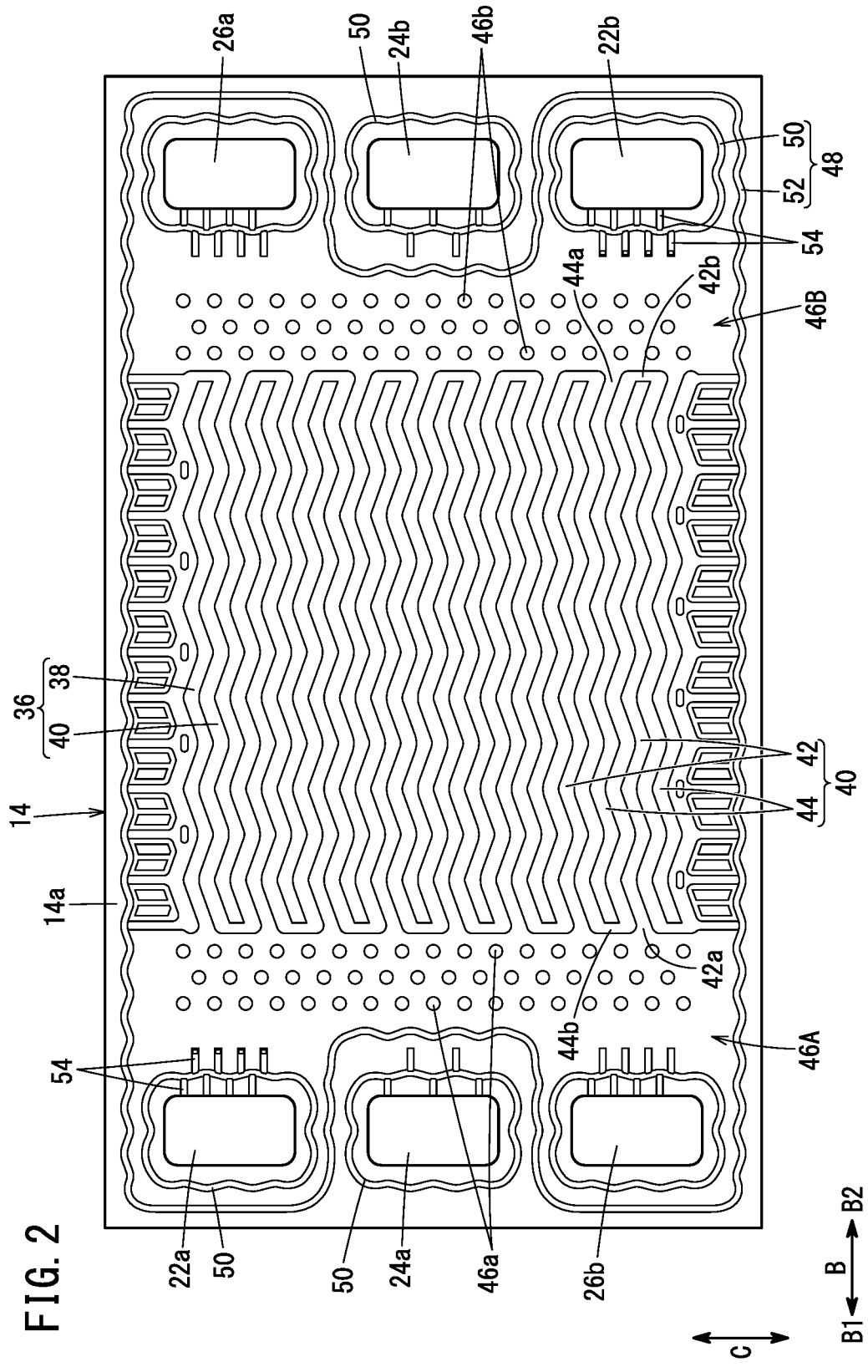
FIG. 2 is a plan view of a first surface of the cathode separator shown in FIG. 1.

As shown in FIG. 2, the cathode separator 14 has an oxygen-containing gas flow field 36 on a first surface 14a facing the MEA 12a. The oxygen-containing gas flow field 36 extends in the arrow B2 direction which is the flowing direction of the oxygen-containing gas. The oxygen-containing gas flow field 36 includes a plurality of cathode line ridges 38 and a plurality of cathode flow field grooves 40. The plurality of cathode line ridges 38 are arranged at regular intervals in the flow field width direction (the arrow C direction). The cathode flow field grooves 40 are formed between the plurality of cathode line ridges 38. The plurality of cathode flow field grooves 40 and the plurality of cathode line ridges 38 are alternately arranged in the flow field width direction (the arrow C direction). The cathode line ridges 38 and the cathode flow field grooves 40 have a wavy shape extending along the long side (the arrow B direction) while meandering in the flow field width direction (the arrow C direction). The cathode line ridges 38 and the cathode flow field grooves 40 may have a linear shape.

The cathode flow field grooves 40 of the present embodiment include a plurality of first cathode flow field grooves 42 and a plurality of second cathode flow field grooves 44. The first cathode flow field grooves 42 are in fluid communication with the oxygen-containing gas supply passage 22a, and are separated from the oxygen-containing gas discharge passage 22b by a protruding portion between the cathode line ridges 38. As shown in the 3A, the first cathode flow field groove 42 has a cathode inflow open end 42a. The cathode inflow open end 42a is located on the upstream side in the flowing direction of the oxygen-containing gas and is formed at an end close to the one end of the long side. The cathode inflow open end 42a is open toward the oxygen-containing gas supply passage 22a.

Figure 3A:
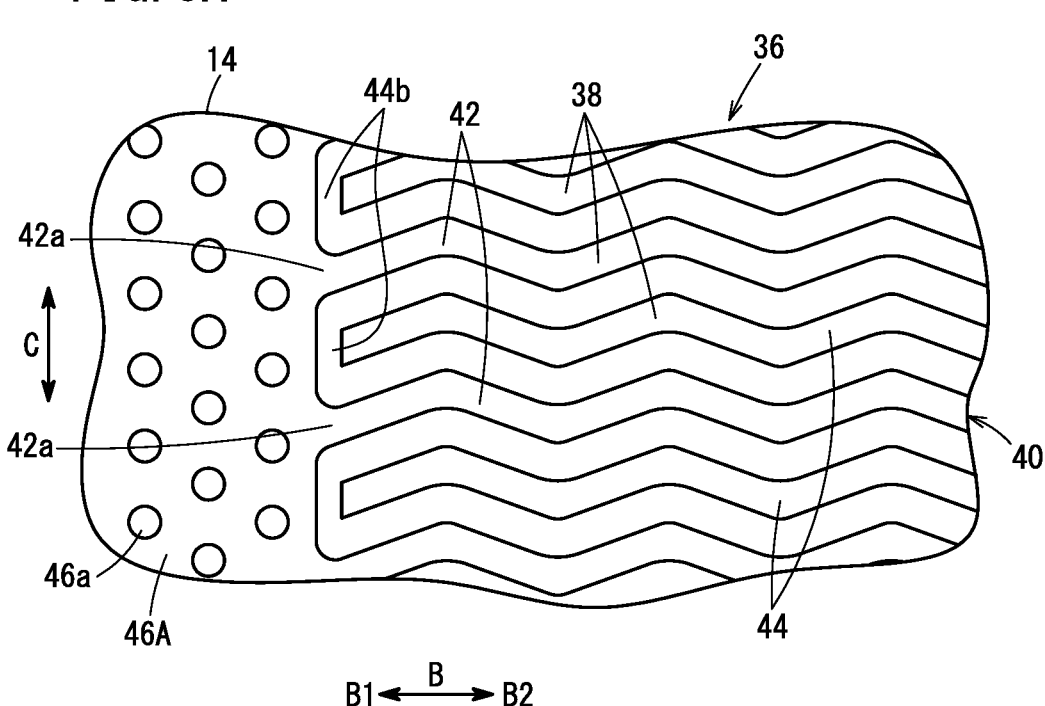
FIG. 3A is an enlarged view of the vicinity of ends of the first cathode flow field groove and the second cathode flow field groove in the arrow B1 direction.
Figure 3B:
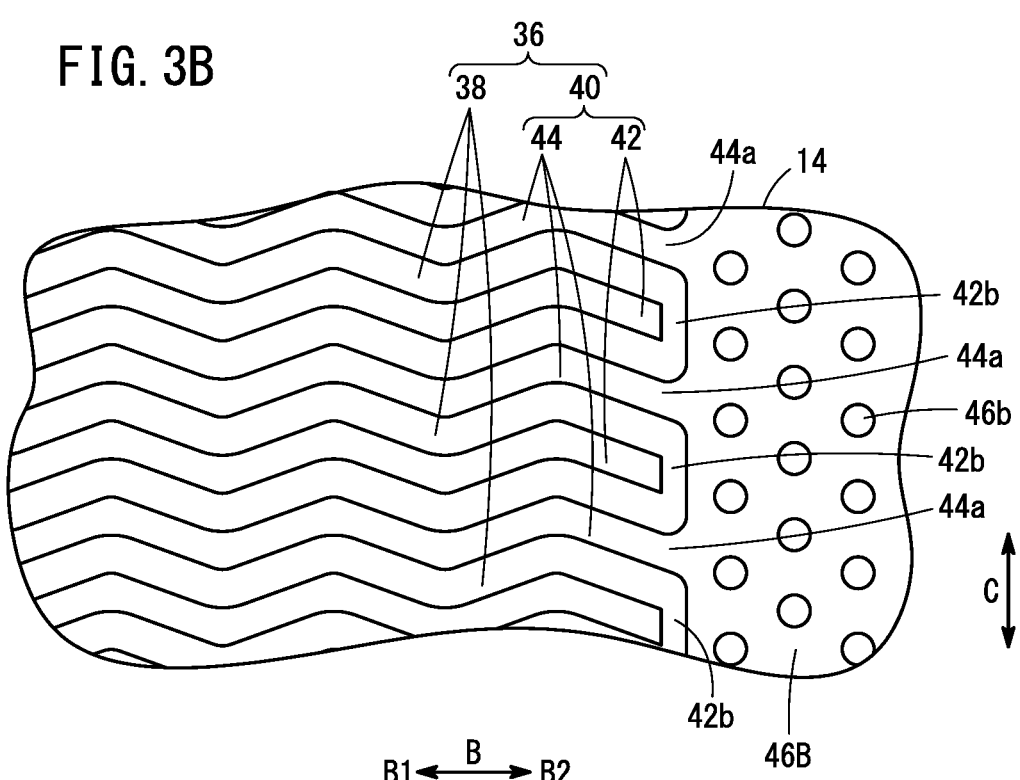
FIG. 3B is an enlarged view of the vicinity of ends of the first cathode flow field groove and the second cathode flow field groove in the arrow B2 direction.
Figure 5:
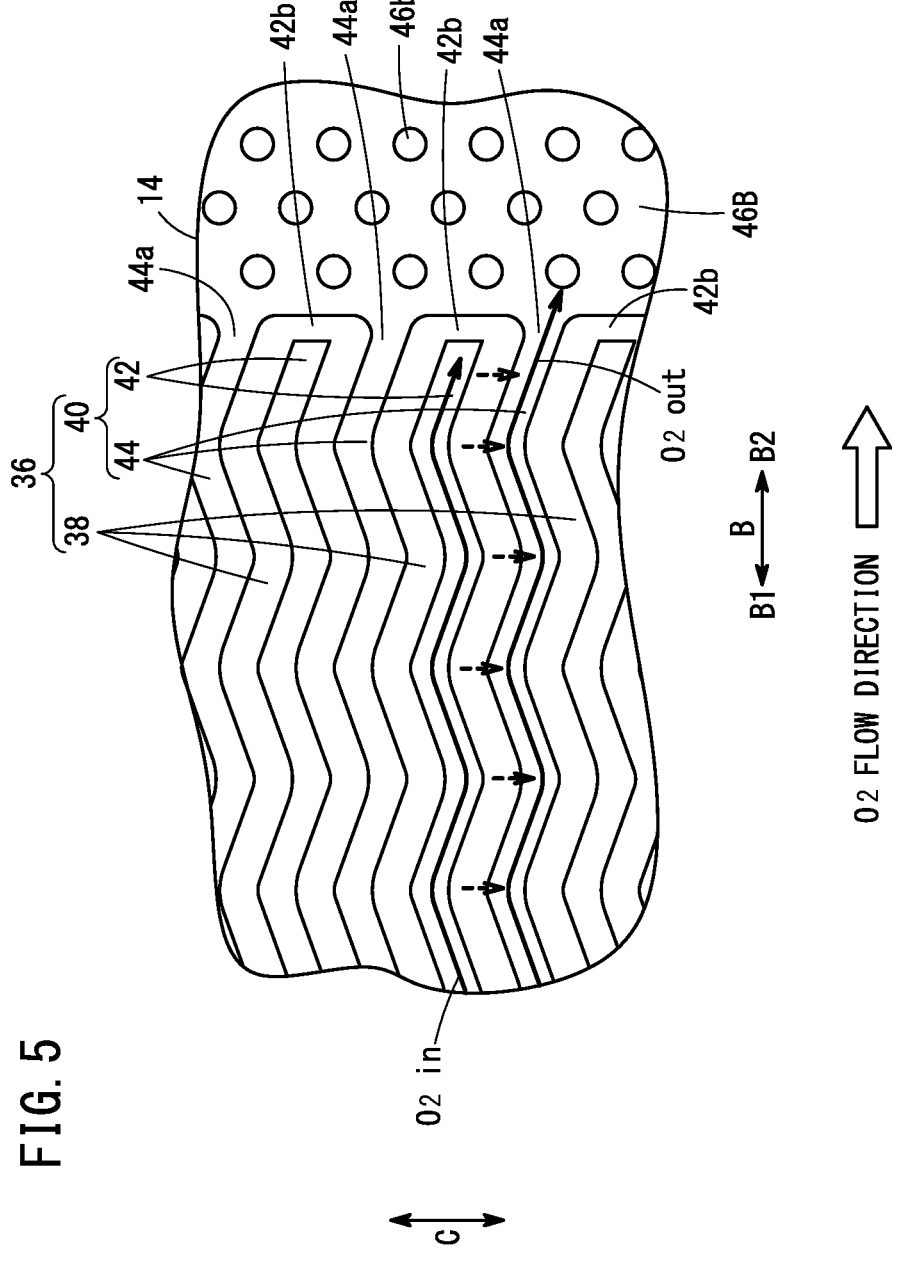
FIG. 5 is an enlarged view illustrating the fluid flow in the cathode separator shown in FIG. 2.

The cathode inflow open end 42a allows the oxygen-containing gas to flow into the first cathode flow field groove 42. As shown in FIG. 3B, the first cathode flow field groove 42 has a cathode outflow blocked end 42b that blocks the first cathode flow field groove 42 at an end close to the other end of the long side. The cathode outflow blocked end 42b is formed by the protruding portion of the cathode separator 14. The protruding portion forming the cathode outflow blocked end 42b is integrally connected to a pair of cathode line ridges 38 adjacent to each other in the flow field width direction. The cathode outflow blocked end 42b prevents the oxygen-containing gas from flowing out from the downstream side of the first cathode flow field groove 42 toward the oxygen-containing gas discharge passage 22b.

As shown in FIG. 2, the second cathode flow field grooves 44 are in fluid communication with the oxygen-containing gas discharge passage 22b, but are not in fluid communication with the oxygen-containing gas supply passage 22a. As shown in FIG. 3A, the second cathode flow field groove 44 has a cathode inflow blocked end 44b that blocks the upstream side of the oxygen-containing gas in the flowing direction. The cathode inflow blocked end 44b is formed at the end close to the one end of the long side. The cathode inflow blocked end 44b is formed by a protruding portion of the cathode separator 14. The protruding portion forming the cathode inflow blocked end 44b is integrally connected to a pair of cathode line ridges 38 adjacent to each other in the flow field width direction of the second cathode flow field groove 44. The cathode inflow blocked end 44b prevents the oxygen-containing gas from flowing from the oxygen-containing gas supply passage 22a into the second cathode flow field groove 44 on the upstream side.

The first cathode flow field grooves 42 and the second cathode flow field grooves 44 are connected to each other through the porous layers such as the gas diffusion layer, the microporous layer, and a dedicated porous layer provided beneath the cathode line ridges 38. In the present embodiment, the porous layers are the first microporous layer 32b and the cathode diffusion layer 32c stacked on the first microporous layer 32b.

As shown in FIG. 3B, the second cathode flow field groove 44 has a cathode outflow open end 44a, which is open toward the oxygen-containing gas discharge passage 22b, at an end close to the other end of the long side. The cathode outflow open end 44a allows the oxygen-containing gas to flow out from the second cathode flow field groove 44.

As shown in FIG. 2, on the first surface 14a of the cathode separator 14, an inlet buffer portion 46A is arranged between the oxygen-containing gas supply passage 22a and the oxygen-containing gas flow field 36. The inlet buffer portion 46A has a plurality of bosses 46a. The cathode separator 14 each have an outlet buffer portion 46B between the oxygen-containing gas discharge passage 22b and the oxygen-containing gas flow field 36. The outlet buffer portion 46B has a plurality of bosses 46b. The bosses 46a, 46b are dot-like protruding portions of the cathode separator 14.

The first surface 14a of the cathode separator 14 has a first seal line 48. The first seal line 48 is a bead seal, bulges toward the resin frame member 28, and abuts against the resin frame member 28. The first seal line 48 is formed by press molding. The first seal line 48 includes passage bead portions 50 and an outer peripheral bead portion 52. The passage bead portions 50 are bead seals each of which surrounds each of the plurality of passages (e.g., the oxygen-containing gas supply passage 22a and so on). The outer peripheral bead portion 52 surrounds the outer periphery of the oxygen-containing gas flow field 36 and prevents the oxygen-containing gas from flowing out of the oxygen-containing gas flow field 36.

Each passage bead portion 50 has a plurality of bridge portions 54 extending along the long side. The bridge portions 54 of the oxygen-containing gas supply passage 22a and the bridge portions 54 of the oxygen-containing gas discharge passage 22b extend toward the oxygen-containing gas flow field 36. The passage bead portions 50 on the first surface 14a of the cathode separator 14 prevent fluids other than the oxygen-containing gas from flowing into the oxygen-containing gas flow field 36.

As shown in FIG. 1, the anode separator 16 has a fuel gas flow field 56 extending in the arrow B direction on a first surface 16a facing the MEA 12. The fuel gas flow field 56 is in fluid communication with the fuel gas supply passage 26a and the fuel gas discharge passage 26b. The fuel gas flow field 56 has a plurality of wavy anode flow field grooves 56b formed between a plurality of wavy anode line ridges 56a extending in the arrow B direction, which is the flowing direction of the fuel gas. The anode flow field groove 56b of the present embodiment does not have a blocked end. All the anode flow field grooves 56b are in fluid communication with the fuel gas supply passage 26a and the fuel gas discharge passage 26b.

The anode separator 16 further includes an inlet buffer portion 58A, an outlet buffer portion 58B, and a second seal line 60 on the first surface 16a. The inlet buffer portion 58A is configured similarly to the inlet buffer portion 46A of the cathode separator 14. The outlet buffer portion 58B is configured similarly to the outlet buffer portion 46B of the cathode separator 14. The second seal line 60 is configured similarly to the first seal line 48 of the cathode separator 14.

A coolant flow field 62 is formed between the cathode separator 14 and the anode separator 16 forming the joint separator 20. The coolant flow field 62 is connected to the coolant supply passage 24a and the coolant discharge passage 24b. The coolant flows through the coolant flow field 62.

The power generation cell 10 of the present embodiment has the configuration described above. The power generation cell 10 of the present embodiment operates as explained blow.

As shown in FIG. 4, the oxygen-containing gas is supplied to the cathode 32 of the MEA 12a through the first cathode flow field grooves 42. The fuel gas is supplied to the anode 34 of the MEA 12a through the anode flow field grooves 56b. The coolant flows through the coolant flow field 62.

The fuel gas passes through the anode diffusion layer 34c and the second microporous layer 34b and is converted into protons by electrochemical reactions in the anode catalyst layer 34a. The protons move through the electrolyte membrane 30 and reach the cathode catalyst layer 32a. The oxygen-containing gas passes through the cathode diffusion layer 32c and the first microporous layer 32b and is supplied to the cathode catalyst layer 32a. The protons and oxygen react in the cathode catalyst layer 32a and generate water. Through the reactions in the cathode catalyst layer 32a and the anode catalyst layer 34a, charges are transferred between the cathode 32 and the anode 34 to generate electric power.

The water generated at the cathode 32 flows into the oxygen-containing gas flow field 36 through the first microporous layer 32b and the cathode diffusion layer 32c as the porous layers, and is discharged from the power generation cell 10 together with the oxygen-containing gas.

In the present embodiment, the first cathode flow field grooves 42 whose downstream side in the flow direction of the oxygen-containing gas is blocked and the second cathode flow field grooves 44 whose upstream side in the flow direction of the oxygen-containing gas is blocked are adjacent to each other in the flow field width direction. Therefore, a pressure difference is created between the pressure of the oxygen-containing gas in the first cathode flow field groove 42 and the pressure of the oxygen-containing gas in the second cathode flow field groove 44, so that a flow of the oxygen-containing gas is generated. That is, a flow of the oxygen-containing gas from the first cathode flow field groove 42 toward the second cathode flow field groove 44 as indicated by the arrows in the drawing is generated in the cathode diffusion layer 32c. The water generated at the cathode 32 is likely to be retained at portions in contact with the cathode line ridges 38 (a portion of the cathode diffusion layer 32c sandwiched between the cathode line ridges 38 and the electrolyte membrane 30). In the power generation cell 10, the flow of the oxygen-containing gas is generated inside the cathode diffusion layer 32c, and the generated water is discharged from the second cathode flow field grooves 44 without being retained.

As shown in FIG. 4, the oxygen-containing gas flowing through the first cathode flow field grooves 42 is partly used in the power generation reactions, and the remaining portion of the oxygen-containing gas flows to the second cathode flow field grooves 44 through the cathode diffusion layer 32c beneath the cathode line ridges 38. The water generated by the power generation reactions flows as water vapor through the second cathode flow field grooves 44 together with the oxygen-containing gas and is discharged from the power generation cell 10.

As described above, because the power generation cell 10 can discharge the water generated inside the cathode 32 by using the active flow of the oxygen-containing gas, the power generation cell 10 has excellent drainage performance. Therefore, the power generation cell 10 can prevent power generation performance from being lowered due to flooding.

Second Embodiment

Figure 6:
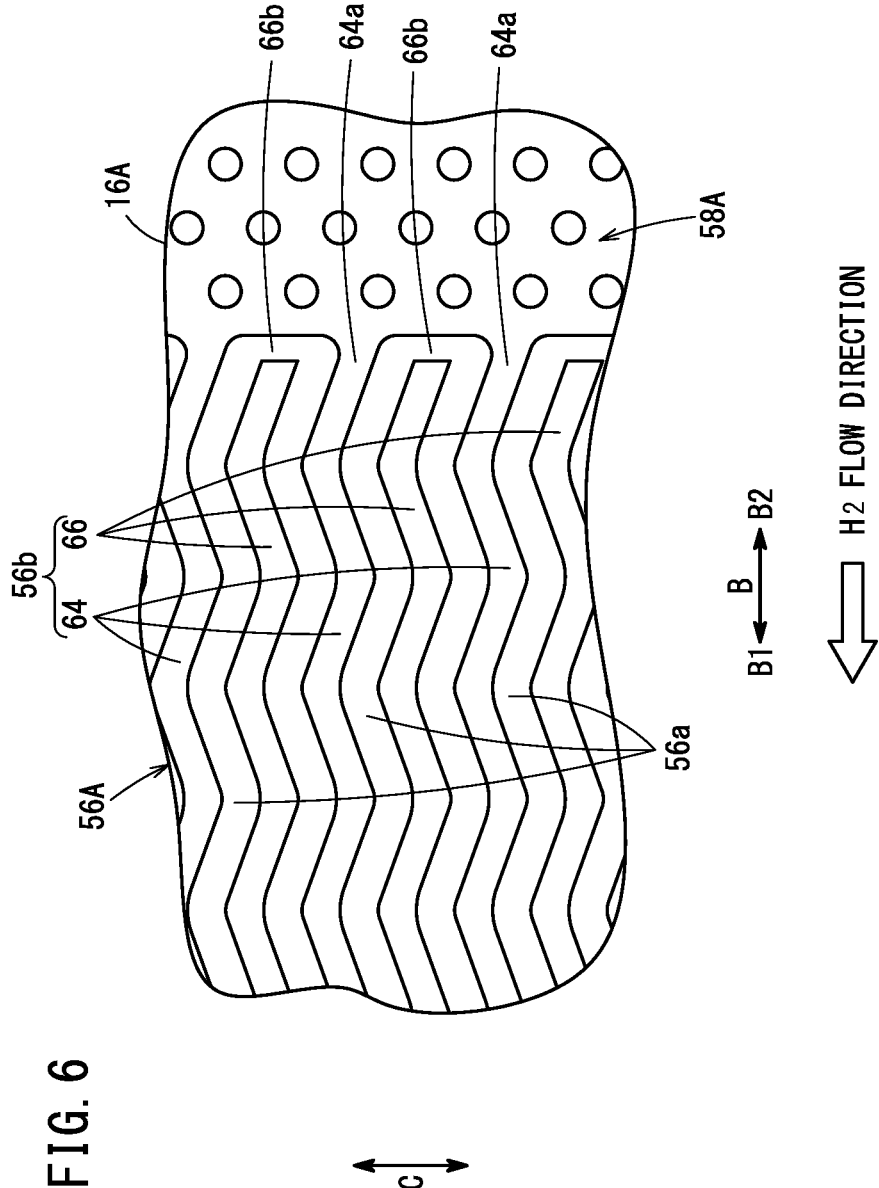
FIG. 6 is an enlarged view of an anode separator according to a second embodiment in the vicinity of ends of a first anode flow field groove and a second anode flow field groove in the arrow B2 direction.

The power generation cell according to the second embodiment includes anode separator 16A shown in FIG. 6 in place of the anode separator 16 in the power generation cell 10 according to the first embodiment. The fuel gas flow field 56A of the anode separator 16A has a drainage structure similar to that of the oxygen-containing gas flow field 36 of the cathode separator 14 (FIG. 2). The anode separator 16A of the present embodiment has the same structure as the anode separator 16 of the first embodiment except for the fuel gas flow field 56A.

The fuel gas flow field 56A of the anode separator 16A has anode flow field grooves 56b between the plurality of anode line ridges 56a. The anode flow field grooves 56b include first anode flow field grooves 64 connected to the fuel gas supply passage 26a and second anode flow field grooves 66 connected to the fuel gas discharge passage 26b.

As shown in the drawing, the first anode flow field groove 64 has an anode inflow open end 64a, which is open toward the fuel gas supply passage 26a, at an end close to the other end of the long side. Although not particularly illustrated, the first anode flow field groove 64 has a first anode blocked end at an end close to the one end of the long side. The first anode blocked end blocks communication between the first anode flow field groove 64 and the fuel gas discharge passage 26b by blocking the first anode flow field groove 64.

As shown in the drawing, the second anode flow field groove 66 has an anode inflow blocked end 66b at an end close to the other end of the long side. The anode inflow blocked end 66b blocks communication between the second anode flow field groove 66 and the fuel gas supply passage 26a by blocking the second anode flow field groove 66. Although not particularly shown, the second anode flow field groove 66 has a second anode open end, which is open toward the fuel gas discharge passage 26b, at an end close to the one end of the long side. The second anode open end allows the fuel gas to flow out from the second anode flow field groove 66 toward the fuel gas discharge passage 26b.

The first anode flow field groove 64 whose downstream side in the flow direction of fuel gas is blocked and the second anode flow field groove 66 whose upstream side in the flow direction of fuel gas is blocked are adjacent to each other in the flow field width direction. Therefore, a flow of the fuel gas from the first anode flow field grooves 64 toward the second anode flow field grooves 66 is generated inside the anode diffusion layer 34c (see FIG. 4) (a portion of the anode diffusion layer 34c sandwiched between the electrolyte membrane 30 and the anode line ridges 56a). Therefore, the anode separator 16A of the second embodiment promotes the discharge of the generated water from the anode 34.

Third Embodiment

Figure 7:
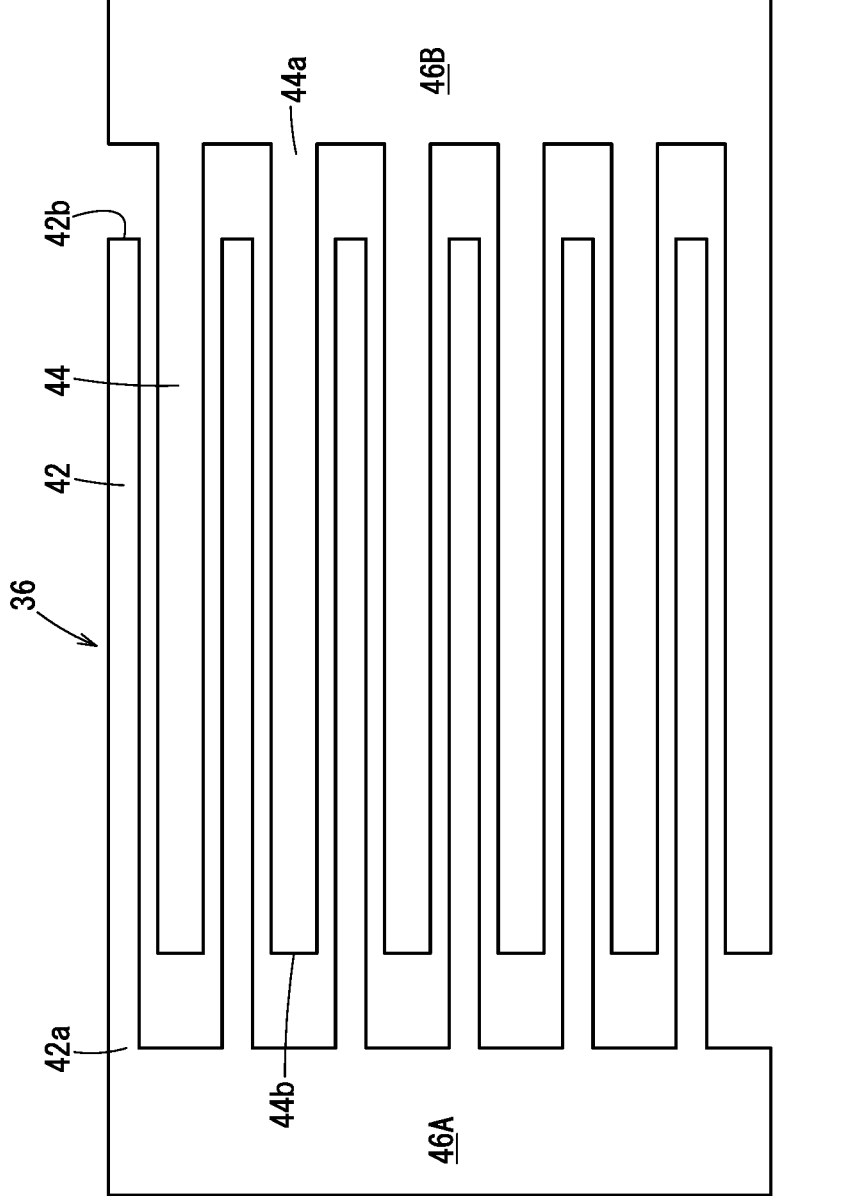
FIG. 7 is a schematic view illustrating an arrangement of oxygen-containing gas flow field of a cathode separator according to a third embodiment.

In the third embodiment, in the power generation cell 10 of FIG. 1, there is a difference between the flow field cross-sectional area of the first cathode flow field groove 42 and the flow field cross-sectional area of the second cathode flow field groove 44. The first cathode flow field groove 42 and the second cathode flow field groove 44 can be schematically represented as shown in FIG. 7.

Due to the properties of fluid, the internal pressure in a flow field generally becomes higher in a flow field having a smaller flow field cross-sectional area, and the internal pressure of the flow field decreases as the flow field cross-sectional area increases. Therefore, in the present embodiment, the flow field cross-sectional area of the first cathode flow field groove 42 is made smaller than the flow field cross-sectional area of the second cathode flow field groove 44. Specifically, in FIG. 7, the width of the first cathode flow field groove 42 is smaller than the width of the second cathode flow field groove 44. Instead of the configuration in which the widths of these grooves have a magnitude relationship, the height (groove depth) of the first cathode flow field groove 42 may be smaller than the height (groove depth) of the second cathode flow field groove 44. As described above, because the flow field cross-sectional area of the first cathode flow field groove 42 is smaller than the flow field cross-sectional area of the second cathode flow field groove 44, the internal pressure in the first cathode flow field groove 42 further increases, and the internal pressure in the second cathode flow field groove 44 further decreases. In this way, the power generation cell 10 of the present embodiment can further increase the pressure difference between the first cathode flow field grooves 42 and the second cathode flow field grooves 44. Therefore, the power generation cell 10 of the present embodiment can discharge the generated water more effectively. The magnitude relationship of the flow field cross-sectional areas described above may also be applied to the anode separator 16A shown in FIG. 6. That is, in the anode separator 16A, the flow field cross-sectional area of the first anode flow field grooves 64 may be smaller than the flow field cross-sectional area of the second anode flow field grooves 66.

Fourth Embodiment

In the fourth embodiment, the distribution of the flow field cross-sectional areas of the first cathode flow field groove 42 and the second cathode flow field groove 44 is modified in the power generation cell 10 of FIG. 1.

As shown in FIG. 8A, because the first cathode flow field grooves 42 and the second cathode flow field grooves 44 respectively have an elongated shape with one end blocked, they are susceptible to flow resistance. Focusing on the first cathode flow field groove 42, the oxygen-containing gas flows out to the cathode 32 while moving from the vicinity of the cathode inflow open end 42a to the cathode outflow blocked end 42b. Therefore, when the flow field cross-sectional area of the first cathode flow field groove 42 is constant in the gas flow direction, the pressure inside the first cathode flow field groove 42 tends to decrease toward the cathode outflow blocked end 42b. On the other hand, focusing on the second cathode flow field groove 44, when the flow field cross-sectional area of the second cathode flow field groove 44 is constant in the gas flow direction, the pressure in the vicinity of the cathode inflow blocked end 44b tends to be higher than the pressure in the vicinity of the cathode outflow open end 44a.

The pressure distribution inside each of the first cathode flow field groove 42 and the second cathode flow field groove 44 as described above causes a variation in the pressure difference between the first cathode flow field groove 42 and the second cathode flow field groove 44 adjacent to each other, and there is a concern that water is likely to be locally retained at a certain area.

Figure 9A:
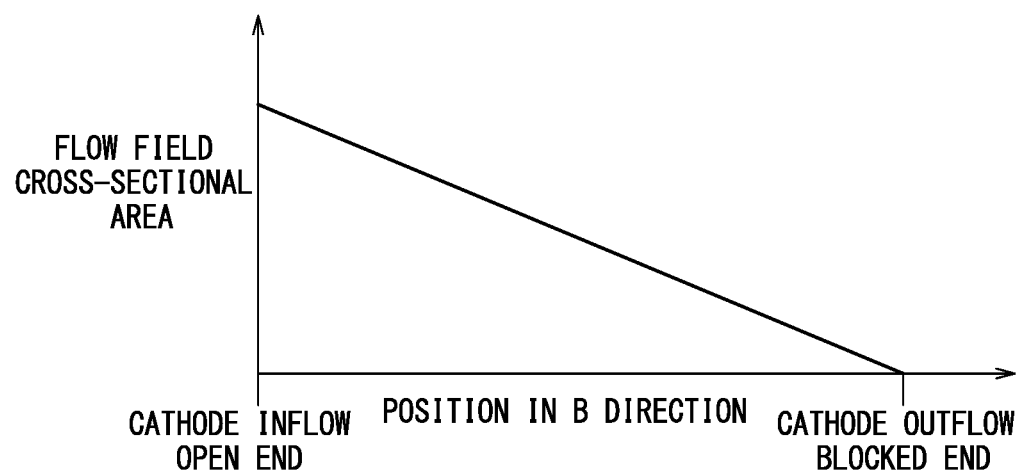
FIG. 9A is a view illustrating a flow field cross-sectional area distribution of the first cathode flow field groove along the center line of the first cathode flow field groove shown in FIG. 8B.

Therefore, as shown in FIGS. 8B and 8C, the heights (groove depths in the arrow A direction) of the first cathode flow field grooves 42 and the second cathode flow field grooves 44 are changed along the gas flow direction. As shown in FIG. 8B, the depth of the first cathode flow field groove 42 gradually decreases from the cathode inflow open end 42a toward the cathode outflow blocked end 42b. Therefore, as shown in FIG. 9A, the flow field cross-sectional area of the first cathode flow field groove 42 gradually decreases from the cathode inflow open end 42a toward the cathode outflow blocked end 42b. Such a distribution of the flow field cross-sectional area of the first cathode flow field groove 42 may be realized by gradually narrowing the width of the first cathode flow field groove 42 toward the cathode outflow blocked end 42b.

Figure 9B:
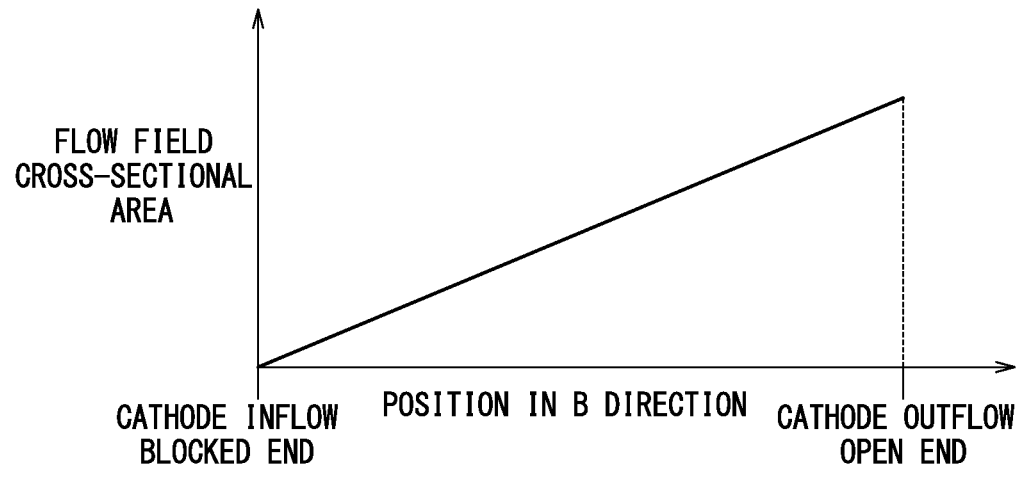
FIG. 9B is a view illustrating a flow field cross-sectional area distribution of the second cathode flow field groove along the center line of the second cathode flow field groove shown in FIG. 8C.

As shown in FIG. 8C, the depth of the second cathode flow field groove 44 gradually increases from the cathode inflow blocked end 44b toward the cathode outflow open end 44a. Therefore, as shown in FIG. 9B, the flow field cross-sectional area of the second cathode flow field groove 44 gradually increases from the cathode inflow blocked end 44b toward the cathode outflow open end 44a. Such a distribution of the flow field cross-sectional area of the second cathode flow field groove 44 may be realized by gradually increasing the width of the second cathode flow field groove 44 toward the cathode outflow open end 44a.

In the first cathode flow field groove 42 of the fourth embodiment, because the first cathode flow field groove is designed to compensate the influence with the flow resistance by the distribution of the flow field cross-sectional area, the pressure along the extending direction is constant. Similarly, in the second cathode flow field groove 44, the pressure along the extending direction is made constant. As a result, the distribution of the pressure difference between the first cathode flow field groove 42 and the second cathode flow field groove 44 adjacent to each other becomes uniform over the entire oxygen-containing gas flow field 36. Therefore, the power generation cell 10 of the present embodiment is further improved in performance of discharging generated water.

The first anode flow field groove 64 and the second anode flow field groove 66 (see FIG. 6) can also have the same flow field cross-sectional area distribution.

The above embodiments are summarized as mentioned below.

There is provided the power generation cell 10 of the fuel cell comprising the membrane electrode assembly 12a, the cathode separator 14 and the anode separator 16, the membrane electrode assembly including the electrolyte membrane 30 and the electrodes arranged on both sides of the electrolyte membrane, the membrane electrode assembly being sandwiched by the cathode separator and the anode separator, wherein the cathode separator comprises the cathode line ridges 38 that protrude from the cathode separator, contact the membrane electrode assembly and extend in the flow direction of the oxygen-containing gas, and the plurality of cathode flow field grooves 40 that are formed between the cathode line ridges and form the oxygen-containing gas flow field, the plurality of cathode flow field grooves comprise the first cathode flow field groove 42 that is blocked on the downstream side in the flow direction of the oxygen-containing gas, and the second cathode flow field groove 44 that is blocked on the upstream side in the flow direction of the oxygen-containing gas, and the second flow field groove is arranged adjacent to the first flow field groove in the flow field width direction. In this case, the anode flow field groove (on the fuel gas side) may have a flow field configuration similar to that conventionally known.

In the power generation cell, a pressure difference is generated between the first cathode flow field groove and the second cathode flow field groove. This pressure difference causes the oxygen-containing gas to flow from the first cathode flow field groove toward the second cathode flow field groove in the membrane electrode assembly. Water generated in the membrane electrode assembly is efficiently removed by an active process caused by the flow of the oxygen-containing gas in addition to a passive process caused by diffusion. Therefore, the power generation cell is excellent in drainage performance, can prevent reaction inhibition due to flooding, and improves power generation efficiency.

The anode separator may include the anode line ridges 56a protruding from the anode separate to contact the membrane electrode assembly and extending in the flowing direction of the fuel gas, and the plurality of anode flow field grooves 56b formed between the anode line ridges and forming the fuel gas flow field, and the plurality of anode flow field grooves 56b include the first anode flow field groove 64 blocked on the downstream side in the flowing direction of the fuel gas and the second anode flow field groove 66 blocked on the upstream side in the flowing direction of the fuel gas, and the second anode flow field groove may be arranged adjacent to the first anode flow field groove in the flow field width direction. The power generation cell including such an anode separator is also excellent in performance of removing water that permeates through the electrolyte membrane to the anode side.

The plurality of cathode flow field grooves may include the plurality of first cathode flow field grooves blocked on the downstream side in the flow direction of the oxygen-containing gas and the plurality of second cathode flow field grooves blocked on the upstream side in the flow direction of the oxygen-containing gas, and the first cathode flow field grooves and the second cathode flow field grooves may be alternately arranged in the flow passage width direction. In this power generation cell, the generated water retained in portions of the membrane electrode assembly in contact with the cathode line ridges can be efficiently discharged through the adjacent second cathode flow field grooves. As a result, the power generation cell improves power generation performance by preventing reaction inhibition due to flooding on the cathode side.

The plurality of anode flow field grooves may include the plurality of first anode flow field grooves blocked on a downstream side in the flow direction of the fuel gas and the plurality of second anode flow field grooves blocked on the upstream side in the flow direction of the fuel gas, and the first anode flow field grooves and the second anode flow field grooves may be alternately arranged in the flow field width direction. The power generation cell improves power generation performance by preventing reaction inhibition due to flooding on the anode side.

The flow field cross-sectional area of the first cathode flow field groove may be smaller than the flow field cross-sectional area of the second cathode flow field groove. This power generation cell achieves the increased internal pressure at the first cathode flow field grooves having the smaller flow field cross-sectional areas, and the decreased internal pressure at the second cathode flow field grooves having the larger flow field cross-sectional areas. As a result, the power generation cell further increases the pressure difference between the first cathode flow field groove and the second cathode flow field groove to further improve the drainage performance.

The flow field cross-sectional area of the first anode flow field groove may be smaller than the flow field cross-sectional area of the second anode flow field groove. The power generation cell further increases the pressure difference between the first anode flow field groove and the second anode flow field groove to further improve the drainage performance.

The first cathode flow field groove may have the flow field cross-sectional area decreasing from upstream to downstream in the flow direction of the oxygen-containing gas, and the second cathode flow field groove may have the flow field cross-sectional area increasing from upstream to downstream in the flow direction of the oxygen-containing gas. In this power generation cell, by making the distribution of the pressure difference between the first cathode flow field groove and the second cathode flow field groove constant, local variation in drainage performance can be suppressed.

The first anode flow field groove may have the flow field cross-sectional area that decreases from upstream to downstream in the flow direction of the fuel gas, and the second anode flow field groove may have the flow field cross-sectional area that increases from upstream to downstream in the flow direction of the fuel gas. In this power generation cell, by making the distribution of the pressure difference between the first anode flow field groove and the second anode flow field groove constant, local variation in drainage performance can be suppressed.

The present invention is not limited to the above-described embodiments, and various configurations can be adopted therein without departing from the essence and gist of the present invention.

The invention claimed is:

1. A power generation cell comprising a membrane electrode assembly, a cathode separator and an anode separator, the membrane electrode assembly including an electrolyte membrane and electrodes arranged on both sides of the electrolyte membrane, the membrane electrode assembly being sandwiched by the cathode separator and the anode separator, wherein the cathode separator is made of a thin metal plate formed by press molding to have a wavy cross section, the cathode separator comprises:

a cathode line ridges that protrude from the cathode separator, contact the membrane electrode assembly and extend in a flow direction of an oxygen-containing gas; and a plurality of cathode flow field grooves that are formed between the cathode line ridges and form an oxygen-containing gas flow field, the plurality of cathode flow field grooves has a wavy shape extending along a long-side direction, the wavy shape being defined by a plurality of regularly spaced rounded crests and rounded troughs in the long-side direction, the plurality of cathode flow field grooves comprise:

a first cathode flow field groove that is connected to an oxygen-containing gas inlet and blocked on a downstream side in the flow direction of the oxygen-containing gas; and a second cathode flow field groove that is connected to an oxygen-containing gas outlet and blocked on an upstream side in the flow direction of the oxygen-containing gas, the first cathode flow field groove and the second cathode flow field groove are separated from each other by the cathode line ridges, the second flow field groove is arranged adjacent to the first flow field groove in the flow field width direction, the oxygen-containing gas outlet is arranged at one end in the flow field width direction, and of the second cathode flow field groove, a portion closest to the oxygen-containing gas outlet in the flow direction of the oxygen-containing gas is directed to the one end at which the oxygen-containing gas outlet is arranged in the flow field width direction.

2. The power generation cell according to claim 1, wherein the anode separator comprises:

anode line ridges that protrude from the anode separator, contact the membrane electrode assembly and extend in a flow direction of a fuel gas; and a plurality of anode flow field grooves that are formed between the anode line ridges and form a fuel gas flow field, and the plurality of anode flow field grooves comprises:

a first anode flow field groove that is blocked on a downstream side in the flow direction of the fuel gas;

a second anode flow field groove that is blocked on an upstream side in the flow direction of the fuel gas, and the second anode flow field groove is arranged adjacent to the first anode flow field groove in the flow field width direction.

3. The power generation cell according to claim 1, wherein the plurality of cathode flow field grooves include a plurality of the first cathode flow field grooves blocked on the downstream side in the flow direction of the oxygen-containing gas and a plurality of the second cathode flow field grooves blocked on the upstream side in the flow direction of the oxygen-containing gas, and each first cathode flow field groove of the plurality of the first cathode flow field grooves and each second cathode flow field groove of the second cathode flow field grooves are alternately arranged with each other repeatedly in the flow field width direction.

4. The power generation cell according to claim 2, wherein the plurality of anode flow field grooves include a plurality of the first anode flow field grooves blocked on the downstream side in the flow direction of the fuel gas, and a plurality of the second anode flow field grooves being blocked on the upstream side in the flow direction of the fuel gas, and each first anode flow field groove of the plurality of the first anode flow field grooves and each second anode flow field groove of the second anode flow field grooves are alternately arranged with each other repeatedly in the flow field width direction.

5. The power generation cell according to claim 1, wherein a flow field cross-sectional area of the first cathode flow field groove is smaller than a flow field cross-sectional area of the second cathode flow field groove throughout the cathode flow field grooves.

6. The power generation cell according to claim 2, wherein a flow field cross-sectional area of the first anode flow field groove is smaller than a flow field cross-sectional area of the second anode flow field groove.

7. The power generation cell according to claim 1, wherein the first cathode flow field groove has a flow field cross-sectional area decreasing from upstream to downstream in the flow direction of the oxygen-containing gas, and the second cathode flow field groove has a flow field cross-sectional area increasing from upstream to downstream in the flow direction of the oxygen-containing gas.

8. The power generation cell according to claim 2, wherein the first anode flow field groove has a flow field cross-sectional area decreasing from upstream to downstream in the flow direction of the fuel gas, and the second anode flow field groove has a flow field cross-sectional area increasing from upstream to downstream in the flow direction of the fuel gas.

*     *     *     *     *